United States Patent
Wehmeyer

(10) Patent No.: US 6,462,133 B2
(45) Date of Patent: Oct. 8, 2002

(54) POLYMERIZING ALKYLENE OXIDE WITH PHOSPAZEN (IUM) CROSSLINKED POLYMER

(75) Inventor: Richard M. Wehmeyer, Lake Jackson, TX (US)

(73) Assignee: Dow Global Technologies, Inc., Midland, MI (US)

( * ) Notice: Subject to any disclaimer, the term of this patent is extended or adjusted under 35 U.S.C. 154(b) by 0 days.

(21) Appl. No.: 09/852,112

(22) Filed: May 9, 2001

(65) Prior Publication Data

US 2002/0022714 A1 Feb. 21, 2002

Related U.S. Application Data

(60) Provisional application No. 60/205,775, filed on May 19, 2000.

(51) Int. Cl.$^7$ .......................... C08G 65/10; C08L 71/02
(52) U.S. Cl. ................. 525/187; 525/330.8; 525/331.4; 528/421
(58) Field of Search ............................. 525/187, 330.8, 525/331.4; 528/421

(56) References Cited

U.S. PATENT DOCUMENTS

| | | | |
|---|---|---|---|
| 3,278,457 A | 10/1966 | Milgrom | 260/2 |
| 3,278,458 A | 10/1966 | Belner | 260/2 |
| 3,278,459 A | 10/1966 | Herold | 260/2 |
| 3,404,109 A | 10/1968 | Milgrom | 260/611 |
| 3,427,256 A | 2/1969 | Milgrom | 252/431 |
| 3,427,334 A | 2/1969 | Belner | 260/429 |
| 3,427,335 A | 2/1969 | Herold | 260/429 |
| 3,538,043 A | 11/1970 | Herold | 260/40 |
| 5,104,575 A | 4/1992 | King et al. | 252/351 |
| 5,145,883 A | 9/1992 | Saito et al. | 521/172 |
| 5,470,813 A | 11/1995 | Le-Khac | 502/175 |
| 5,952,457 A | 9/1999 | Kouno et al. | 528/408 |
| 5,990,352 A | 11/1999 | Nobori et al. | 564/12 |

FOREIGN PATENT DOCUMENTS

| | | |
|---|---|---|
| EP | 0 763 555 A2 | 3/1997 |
| EP | 0 879 838 A2 | 11/1998 |
| EP | 0 897 940 A2 | 2/1999 |
| EP | 0 916 686 A1 | 5/1999 |
| EP | 0 950 679 A2 | 10/1999 |

OTHER PUBLICATIONS

R. Schwesinger; Univ. Freiburg, Fed. Rep. Ger.; *Nachr. Chem., Tech Lab* (1990) 38(10); pp. 1214–1216, 1218–1219, 1222, 1225–1226 (in German).

R. Schwesinger, et al.; "Novel, Very Strong, Unchanged Auxiliary Bases; Design and Synthesis of Monomeric and Polymer–Bound Triaminoiminophosphorane Bases of Broadly Varied Steric Demand"; *Chem. Ber.*; 1994; 127; pp. 2435–2454.

R. Schwesinger, et al.; "Peralkylated Polyaminophosphazenes–Extremely Strong, Neutral Nitrogen Bases"; *Angew. Chem. Int. Ed. Engl.*; 26(1987); No. 11; pp. 1167–1169.

R. Schwesinger, et al.; "How Strong and How Hindered Can Uncharged Phosphazine Bases Be?"; *Angew. Chem. Int. Ed. Engl.*; 1993; 32; pp. 1361–1363.

R. Schwesinger, et al.; "Extremely Strong, Uncharged Auxiliary Bases, Monomeric and Polymer–Supported Polyaminophosphazines ($P_2$–$P_5$)"; *Liebigs Ann.*; 1996; pp. 1055–1081.

*Primary Examiner*—Robert E. L. Sellers

(57) ABSTRACT

Crosslinked organic polymers such as styrene-divinylbenzene copolymers contain pendant phosphazene or phosphazenium groups. These polymers are excellent alkylene oxide polymerization catalysts.

21 Claims, No Drawings

POLYMERIZING ALKYLENE OXIDE WITH PHOSPAZEN (IUM) CROSSLINKED POLYMER

CROSS-REFERENCE STATEMENT

This application claims the benefit of U.S. application Ser. No. 60/205,775, filed on May 19, 2000.

BACKGROUND OF THE INVENTION

Alkylene oxides such as ethylene oxide, propylene oxide and 1,2-butylene oxide are polymerized to form a wide variety of polyether products. For example, polyether polyols are prepared in large quantities for polyurethane applications. Other polyethers are used as lubricants, brake fluids, compressor fluids, and many other applications.

These polyethers are commonly prepared by polymerizing one or more alkylene oxides in the presence of an initiator compound and an alkali metal catalyst. The initiator compound is typically a material having one or more hydroxyl, primary or secondary amine, carboxyl or thiol groups. The function of the initiator is to set the nominal functionality (number of hydroxyl groups/molecule) of the product polyether, and in some instances to impart some desired functional group to the product.

Until recently, the catalyst of choice was an alkali metal hydroxide such as potassium hydroxide. Potassium hydroxide has the advantages of being inexpensive, adaptable to the polymerization of various alkylene oxides, and easily recoverable from the product polyether.

However, to a varying degree, alkali metal hydroxides catalyze an isomerization of propylene oxide to form allyl alcohol. Allyl alcohol acts as a monofunctional initiator during the polymerization of propylene oxide. Thus, when potassium hydroxide is used to catalyze propylene oxide polymerizations, the product contains allyl alcohol-initiated, monofunctional impurities. As the molecular weight of the product polyether increases, the isomerization reaction becomes more prevalent. Consequently, poly(propylene oxide) products prepared using KOH as the catalyst at equivalent weights of about 800 or more tend to contain very significant quantities of the monofunctional impurities. This tends to reduce the average functionality and broaden the molecular weight distribution of the product.

More recently, the so-called double metal cyanide (DMC) catalysts have been used commercially as polymerization catalysts for alkylene oxides. These DMC catalysts are described, for example, in U.S. Pat. Nos. 3,278,457, 3,278,458, 3,278,459, 3,404,109, 3,427,256, 3,427,334, 3,427,335 and 5,470,813, among many others. Because these catalysts do not significantly promote the isomerization of propylene oxide, polyethers having low unsaturation values and higher molecular weights can be prepared, compared to potassium hydroxide-catalyzed polymerizations.

Unfortunately, the DMC catalysts have other significant drawbacks. DMC catalysts are difficult to separate from a polyether polyol. As a result, most of the time the catalyst is simply left in the polyol. This requires that the catalyst be continually replaced, which adds to the cost of producing the polyether. In some cases, the DMC catalyst interferes with downstream uses of the polyol, and so cannot be left in the polyol. Perhaps more important is that DMC catalysts are not effective in producing ethylene oxide-capped poly (propylene oxides). These capped polyols represent a significant portion of the demand for polyols for polyurethane applications. As a result, polyol manufacturers using DMC catalysts must in addition conduct separate ethylene oxide-capping processes using in most cases conventional alkali metal hydroxide catalysts.

Even more recently, certain phosphazene and phosphazenium compounds have been mentioned as alkylene oxide polymerization catalysts. See, for example, U.S. Pat. Nos. 5,952,457 and 5,990,352, as well as EPO-A-0 763 555, 0 879 838, 0 897 940, 0 916 686 and 0 950 679. These compounds are reported to provide good polymerization rates and to provide poly(propylene oxide) polymers having low levels of unsaturation. Moreover, these compounds are capable of producing ethylene oxide-capped poly(propylene oxides). However they are quite expensive and difficult to separate from the product polyether. Thus, the polyol manufacturer must either engage in expensive steps to recover the catalyst, or else ship the product with the catalyst still in it. Either option significantly increases the cost of the polyether. Moreover, the strongly basic catalyst interferes with many downstream uses of the polyether.

It would be desirable to provide an alkylene oxide polymerization catalyst that provides good polymerization rates, produces poly(propylene oxide) polymers with low levels of unsaturation, allows for the production of ethylene oxide-capped poly(propylene oxide) polymers, and is inexpensively removed from the product polyol.

SUMMARY OF THE INVENTION

In one aspect, this invention is a cross-linked organic polymer having pendant phosphazene groups including at least two phosphorus atoms or phosphazenium groups including one or more phosphorus atoms.

In another aspect, this invention is a method comprising subjecting an alkylene oxide to polymerization conditions in the presence of an initiator compound and a catalytically effective amount of a crosslinked organic polymer having pendant phosphazene or phosphazenium groups, wherein said crosslinked organic polymer is substantially insoluble in said alkylene oxide and said polyether.

DETAILED DESCRIPTION OF THE INVENTION

In this invention, a crosslinked organic polymer having pendant phosphazene or phosphazenium groups is used as a catalyst for an alkylene oxide polymerization.

By "phosphazene" group, it is meant an uncharged group containing a chain of alternating nitrogen and phosphorus atoms which contains at least two nitrogen atoms in the chain. The phosphazene group will contain at least one —N=P—N— linkage in the chain. It is preferred that the phosphazene group contains at least two phosphorus atoms in the chain. The phosphazene group more preferably has from about 2 to about 6 phosphorus atoms. The chain of nitrogen and phosphorus atoms may be branched. It is most preferred that each phosphorus atom is bound to four nitrogen atoms. Typically, each phosphorus atom will be singly bonded to three nitrogen atoms, and doubly bonded to a fourth nitrogen atom.

A "phosphazenium" group is a corresponding cationic group. With phosphazenium groups, it is preferred that the chain contains from about 1 to about 6 phosphorus atoms. As before, the chain of nitrogen and phosphorus atoms may be branched. It is most preferred that each phosphorus atom is bound to four nitrogen atoms.

Thus, polymers containing phosphazene groups can be represented by the structures $$\text{Polymer-}[N=P\{[-N=P(A_2)]_x-NR_2\}_3]_z \quad \text{(I)}$$

and $$\text{Polymer-}\{NR^1-[P(A_2)=N]_x-P(A_2)=NR\}_z \quad \text{(IA)}$$

Similarly, polymers containing phosphazenium groups can be represented by the structures $$\text{Polymer-}[NR^1-P^+\{[-N=P(A_2)]_x-NR_2\}_3]_z \quad \text{(II)}$$

and $$\text{Polymer-}\{NR-[P(A_2)=N]_x-P^+(A_2)-NRR^1\}_z \quad \text{(IIA)}$$

In these formulae, each R and $R^1$ is independently in each occurrence (a) an unsubstituted or inertly substituted alkyl or aryl group, (b) an unsubstituted or inertly substituted alkylene or arylene group that, together with another R or $R^1$ group on the same nitrogen atom, forms a ring structure including that nitrogen atom, (c) an unsubstituted or inertly substituted alkylene or arylene group that, together with a R or $R^1$ group bonded to a different nitrogen atom bonded to a common phosphorus atom, forms a ring structure including an —N—P—N— or —N—P=N— moiety, or (d) hydrogen. Each R is preferably a $C_{1-10}$ alkyl group, or together with another R forms a $C_{2-5}$ alkylene group that forms part of a ring structure with a nitrogen atom or an —N—P—N— or —N—P=N— moiety. Each $R^1$ is preferably hydrogen, methyl, ethyl, n-propyl or isopropyl, or together with another R forms a $C_{2-5}$ alkylene group that forms part of a ring structure with a nitrogen atom or an —N—P—N— or —N—P=N— moiety. Each A is independently —[N=P(A_2)]_x—NR_2, where R is as before. Each x is independently zero or a positive integer. The values of the various x's are preferably such that the group contains 2–6 phosphorus atoms in the case of phosphazene groups, and 1–6 phosphorus atoms in the case of phosphazenium groups. z is a positive integer.

It is noted that the charge on any phosphazenium group will be delocalized throughout the phosphazenium group and may not reside on the particular phosphorus atom shown as carrying the charge in formulae II or IIA. Although not shown in formulae II or IIA, the phosphazenium group in all cases will be associated with a counterion, which can be, for example, halogen, hydroxide, nitrate, sulfate, and the like. The counterion can also be an alcoholate. Preferred counterions are hydroxyl and alcoholates formed by the extraction of an alcoholic proton from a polyhydric initiator compound. It has been found that the catalyst has greater activity when the counterion on the phosphazenium groups is hydroxyl or alcoholate. The groups can be converted to the hydroxyl form by washing the catalyst with a solution of an alkali metal hydroxide such as sodium hydroxide in water or a mixture of water and methanol. At least a stoichiometric amount of hydroxide ions are provided based on the phosphazenium groups.

The crosslinked organic polymer is any polymer that is (1) sufficiently cross-linked to be insoluble in alkylene oxides and polyether polyols made from the alkylene oxides, (2) is chemically stable under strongly basic conditions, and (3) does not react in an undesirable way with a phosphazene or phosphazenium group, an alkylene oxide or a polyether. They are preferably particulate and have a particle size such that they can be separated from a liquid by filtration. Particle sizes of from about 0.1 mm to about 5 mm are especially suitable. A preferred, commonly available type of crosslinked organic polymer is a crosslinked alkenyl aromatic polymer, particularly a crosslinked polymer or copolymer of styrene. Especially preferred crosslinked organic polymers are particulate, swellable copolymers of styrene and a crosslinking agent such as divinyl benzene. Commercially available absorbent resins of this type are suitable. So-called macroporous types as well as the so-called gel-type resins are useful crosslinked polymers. Such copolymer resin beads are commercially available from Aldrich Company.

Because of the chemistry of phosphazene and phosphazenium groups, it is convenient to use an organic polymer that contains halogen, especially aliphatic halogen, or primary or secondary amine groups as a starting material. Halogenation can be introduced into the organic polymer by, for example, polymerizing or copolymerizing a halogenated monomer into the polymer. Halogenated crosslinked alkenyl aromatic polymers are conveniently prepared through a haloalkylation reaction, such as by the well-known reaction of the polymer with chloromethyl methyl ether. These reactions introduce haloalkyl groups onto the aromatic rings of the polymer. Amine-functional organic polymers are conveniently made by reacting a halogenated organic polymer with ammonia or a primary amine.

Phosphazene and phosphazenium groups can be attached to the organic polymer support in various ways. In general, the two main methods are (1) to attach a previously-formed phosphazene or phosphazenium group to the organic polymer, and (2) to "build" the phosphazene or phosphazenium group onto the organic polymer. Note that in many cases, once a phosphazene group is attached to an organic polymer support, it can be converted to a phosphazenium group. This can be done, for example, by reacting the phosphazene group with an alkyl halide having the structure $R^1X$, where X denotes the halide ion, especially a chloride, bromide or iodide ion, to form the halide salt of the corresponding phosphazenium. This reaction is conveniently performed in an inert solvent such as tetrahydrofuran and at an elevated temperature such as about 40–100° C. Conversely, those phosphazenium groups having an —NH—P— linkage can be converted to the corresponding phosphazene by reaction with a suitable strong base, as described more below.

Several preparation methods are described below. Methods A and B involve attaching a previously formed phosphazenium group onto the polymer. Methods C–G involve "building" the groups on the polymer.

1. Method A—Direct Preparation of Phosphazenium Groups

The phosphazenium-substituted polymer can be prepared by introducing halogen, preferably haloalkyl substitution, onto the crosslinked polymer. The halogen-substituted polymer is then reacted with a phosphazene compound of the structure $$NR^1=P\{[-N=P(A_2)]_x-NR_2\}_3 \quad \text{(III)}$$

The halogen salt of the phosphazenium-substituted polymer is formed directly and has a structure corresponding to II above. It has been found that this reaction goes very slowly in most cases, except when $R^1$ is hydrogen, ethyl, methyl, propyl and isopropyl. When the resulting phosphazenium groups contain an —NH—P— linkage, the corresponding phosphazene-substituted polymer can be prepared by treating the phosphazenium-substituted polymer with a strong base such as an alkali metal hydride (e.g., potassium hydride) or an alkali metal hydroxide (e.g., potassium or cesium hydroxide), sodium amide, another phosphazene compound or the like. In general, the larger the phosphazenium group, the stronger the base that is required to convert it to the phosphazene.

2. Method B—Direct Preparation of Phosphazenium Groups

A second way of making the phosphazenium-substituted polymer is to react a halogen-substituted polymer with a phosphazenium compound of the structure $$[NHR^1—P^+\{[—N=P(A_2)]_x—NR_2\}_3]X— \quad (IV)$$

in the presence of a strong base. Again, a phosphazenium-substituted polymer corresponding to structure II is formed directly. When the phosphazenium groups contain an —NH—P— linkage, the corresponding phosphazene-substituted polymer can be prepared by treating the phosphazenium-substituted polymer with a strong base as described before. An example of a reaction sequence of this type is:

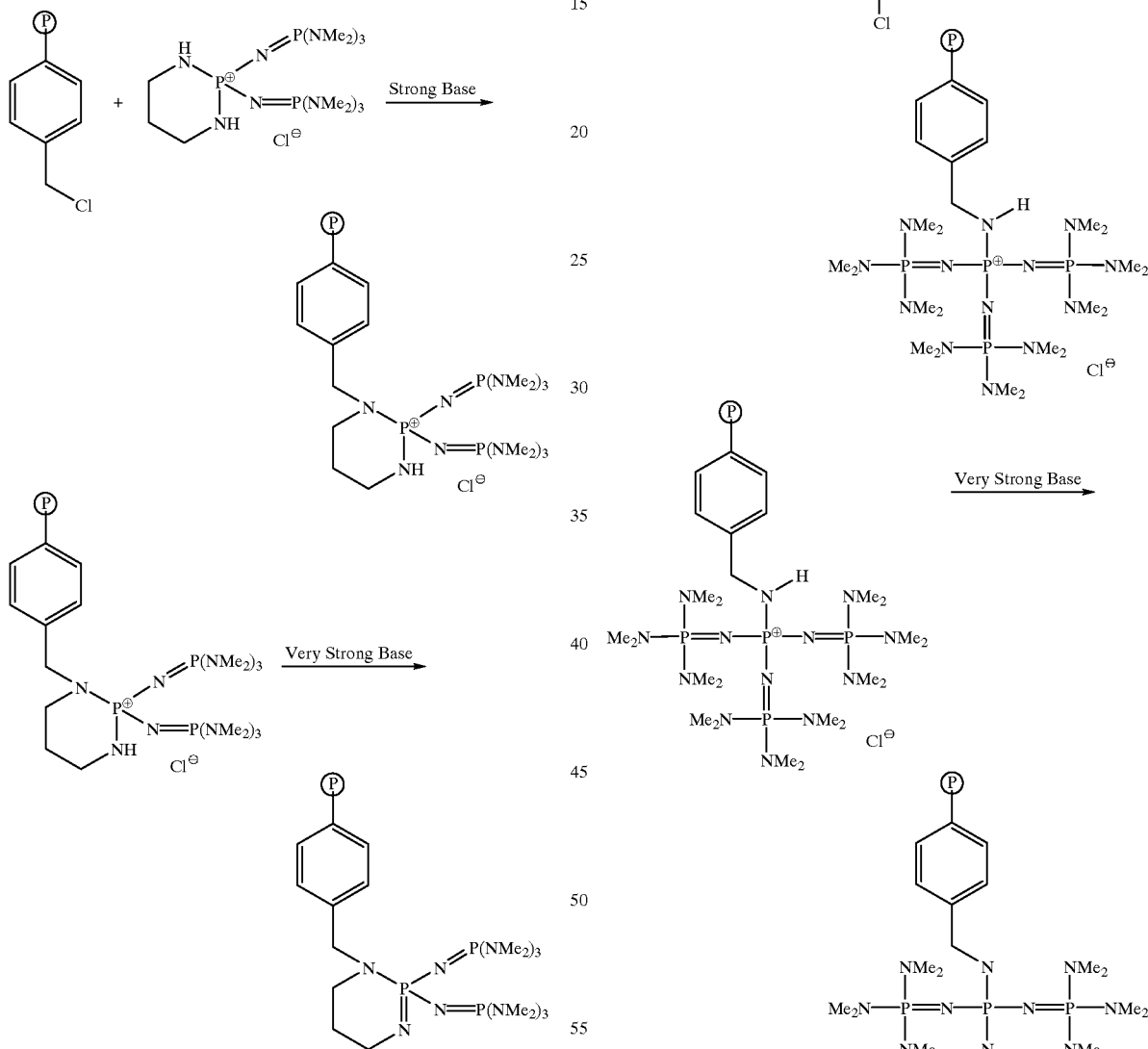

3. Method C—"Building" Phosphazenium Groups Directly Onto a Polymer with Pendant —NH$_2$ groups.

In this method, an amine-substituted organic polymer is reacted with phosphorus pentachloride and then with an excess of a compound having the structure NH=P{[—N=P(A$_2$)]$_x$—NR$_2$}$_3$. The corresponding phosphazenium group (in the chloride form) is formed directly. It is preferred to convert the resin to the hydroxide or alcoholate form as discussed before. When the phosphazenium groups contain an —NH—P— linkage, they may be converted to phosphazene groups by treatment with a strong base as described before. An example of a synthesis of this type is shown below:

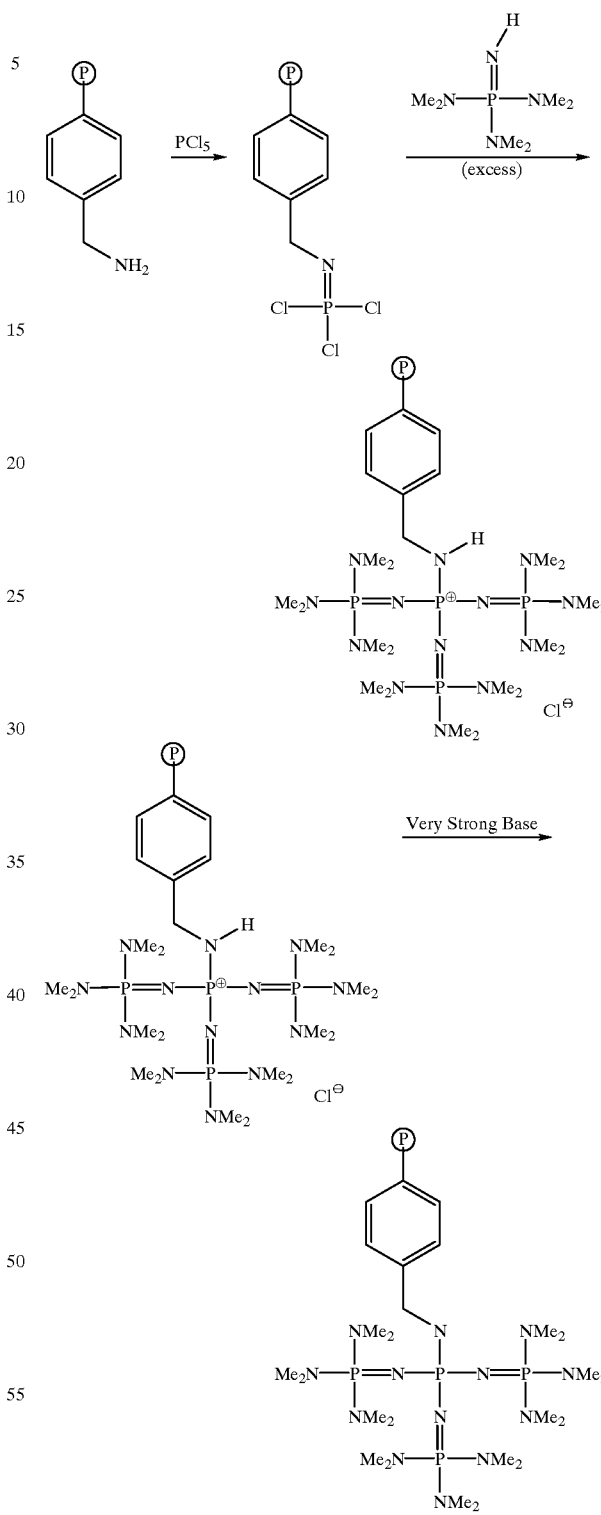

4. Method D—"Building" Phosphazenium Groups Directly Onto Certain Diamine-Substituted Polymers A variation of the technique just described uses a diamine-substituted organic polymer as a starting material. The amine groups each have at least one amine hydrogen atom and are separated by one or more, preferably about 3, methylene groups. This starting material is reacted with phosphorus pentachloride, then with an excess of a compound having the structure NH=P{[—N=P($A_2$)]$_x$—N$R_2$}$_3$. The resulting phosphazenium groups in the chloride form have a cyclic structure including a —N—P=N— moiety. It is preferred to convert the resin to the hydroxide or alcoholate form as discussed before. When the phosphazenium groups contain an —NH—P— linkage, they may be converted to phosphazene groups by treatment with a strong base as described before. An example of such a synthesis follows:

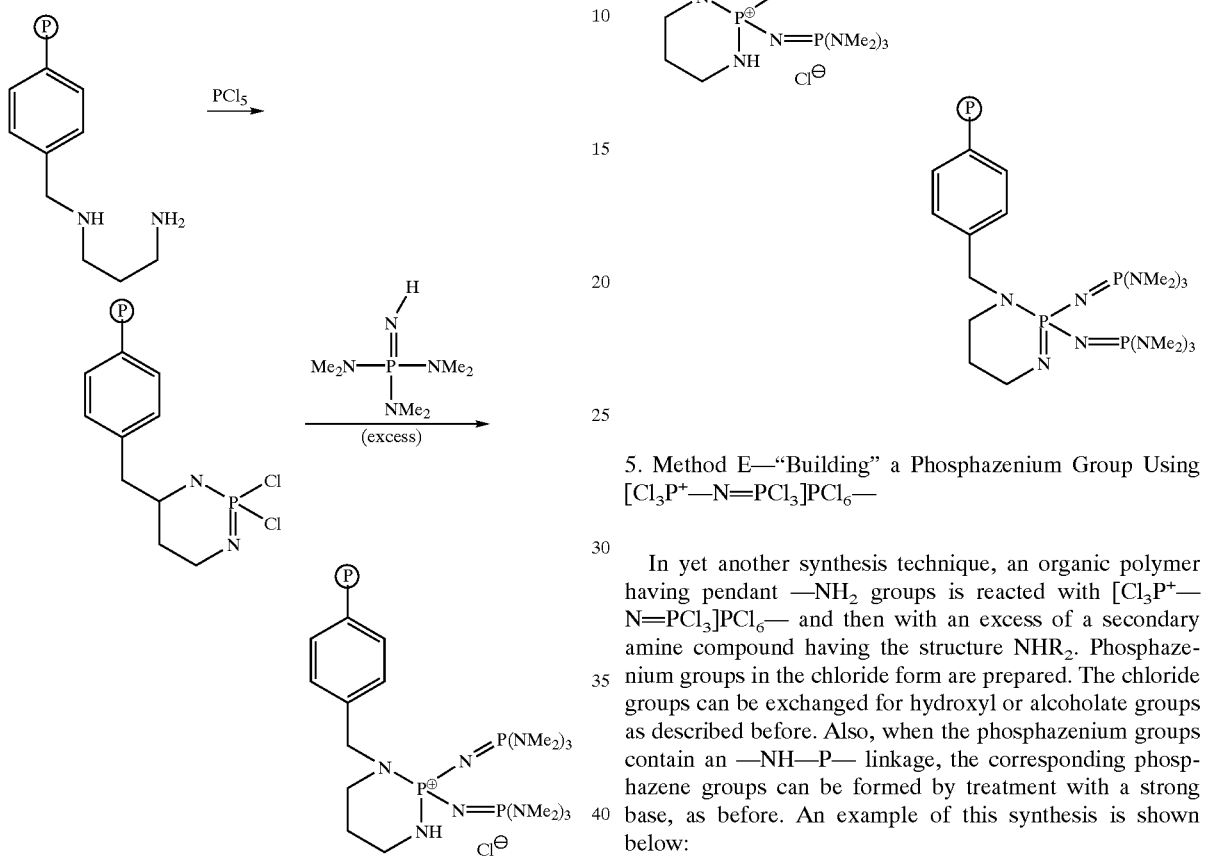

5. Method E—"Building" a Phosphazenium Group Using [Cl$_3$P$^+$—N=PCl$_3$]PCl$_6$—

In yet another synthesis technique, an organic polymer having pendant —NH$_2$ groups is reacted with [Cl$_3$P$^+$—N=PCl$_3$]PCl$_6$— and then with an excess of a secondary amine compound having the structure NHR$_2$. Phosphazenium groups in the chloride form are prepared. The chloride groups can be exchanged for hydroxyl or alcoholate groups as described before. Also, when the phosphazenium groups contain an —NH—P— linkage, the corresponding phosphazene groups can be formed by treatment with a strong base, as before. An example of this synthesis is shown below:

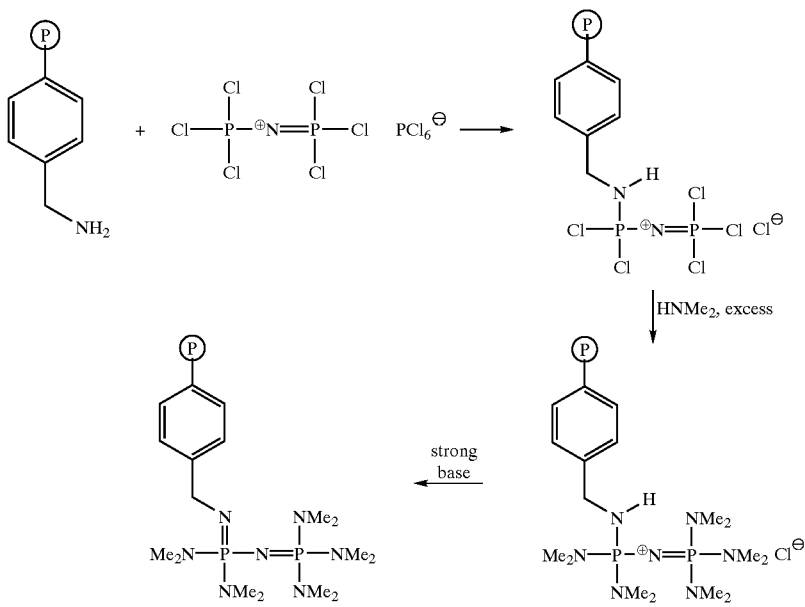

5. Method F—"Building" a Phosphazenium Group Using [Cl$_3$P$^+$—N=PCl$_3$]PCl$_6^-$ and an —NHR-substituted Polymer In a variation of the technique just described, the organic polymer contains pendant —NHR groups instead of —NH$_2$ groups. In this case, the phosphazenium group is formed, but cannot be easily converted to the corresponding phosphazene. An example of this synthesis is shown below:

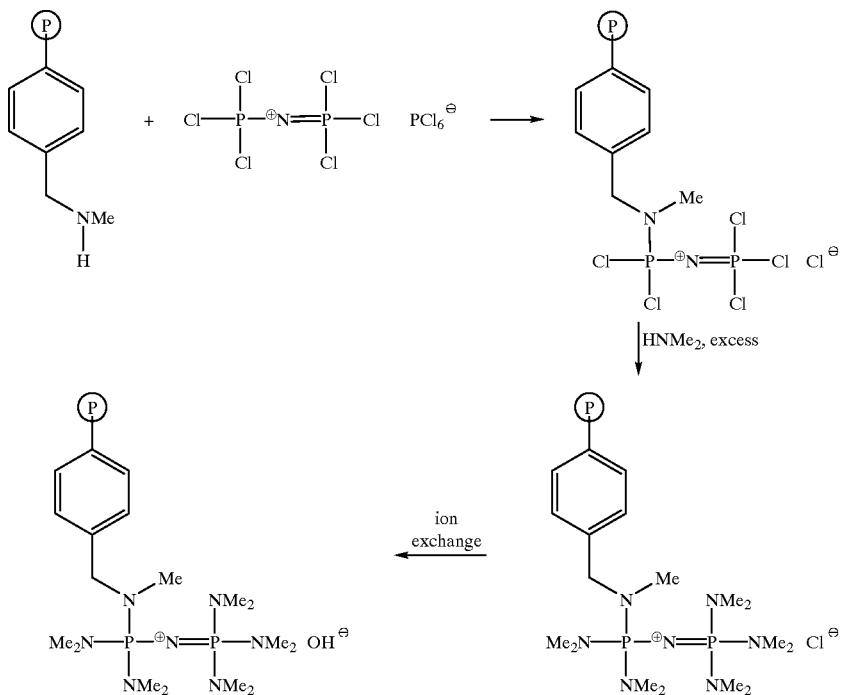

7. Method G—"Building" Phosphazene Groups

A polymer containing pendant —NHR groups is reacted with a bis(disubstituted amino) phosphorus oxychloride ((R$_2$N)$_2$POCl) to form pendant —NR—P(O)—(NR$_2$)$_2$ groups. These groups are then chlorinated by reaction with a chlorinating agent such as phosphorus oxychloride (POCl$_3$), chlorine, and the like, and reacted with ammonia and a base to form pendant —NR—P(NR$_2$)$_2$=NH groups. To form terminal =NR groups, a primary amine of the form H$_2$NR is used instead of ammonia. The sequence of reactions with bis(disubstituted amino) phosphorus oxychloride, phosphorus oxychloride, ammonia (or primary amine) and base may be repeated one or more times. In any of these reactions, the bis (disubstituted amino) phosphorus oxychloride may be replaced with an A$_2$POCl compound to introduce branching. The phosphazene group prepared in this way can be quaternized by reaction with an organic halide (R$^1$X), as described before.

Phosphazenes according to structures (III) and (IV) above can be prepared according to processes such as are described in EP-A-0 879-838, particular pages 6–7 thereof, incorporated herein by reference. In addition, the synthesis of phosphazene and phosphazenium compounds is described in Schwesinger, R.; et. al. *Liebigs Ann.* 1996, 1055–1081, Schwesinger, R.; et. al. *Chem. Ber.* 1994, 127, 2435–2454, Schwesinger, R. *Nachr. Chem. Tech. Lab.* 1990, 38(10), 1214–1226, Schwesinger, R.; Schlemper, H. *Angew. Chem. Int. Ed. Engl.* 1987, 26(11), 1167–1169 and Schwesinger, R.; et. al. *Angew. Chem. Int. Ed. Engl.* 1993, 32(9), 1361–1363.

Techniques described therein can be used to make starting materials for use herein, and can be adapted for making the phosphazene or phosphazenium-substituted polymer.

The product is a supported catalyst that may have, for example, from about 0.1 to about 10 mmols of phosphazenium groups per gram of supported catalyst.

It is preferred to wash the catalyst with water and/or methanol or similar organic solvent, and then to dry it well, such as in a vacuum oven, before use in order to remove impurities and undesired by-products of the synthesis reactions.

The supported catalyst of the invention is used to polymerize alkylene oxides to make polyethers. In general, the process includes mixing a catalytically effective amount of the catalyst with an alkylene oxide under polymerization conditions and allowing the polymerization to proceed until the supply of alkylene oxide is essentially exhausted. The concentration of the catalyst is selected to polymerize the alkylene oxide at a desired rate or within a desired period of time. Enough of the supported catalyst is used to provide at least about 0.0001 millimole of phosphazenium groups per gram of polyether to be produced. As the supported catalyst is easily recovered from the product, any larger amount can be used as long as the reaction can be controlled. More preferred catalyst levels are from about 0.0005, most preferably from about 0.001, to about 0.1, most preferably to about 0.025 mmol of phosphazenium groups per gram of product polyether. In this context, the weight of the product polyether is considered to be equal to the combined weight of the initiator compound, if any, plus added alkylene oxides.

For making high molecular weight monofunctional polyethers, it is not necessary to include an initiator compound. However, to control molecular weight, impart a desired functionality (number of oxyalkylatable groups/molecule) or a desired terminal functional group, an initiator compound as described before is preferably mixed with the catalyst complex at the beginning of the reaction. The initiator compound contains one or more functional groups that is capable of being oxyalkylated with an alkylene oxide or oxetane, such as hydroxyl, primary or secondary amine, thiol and carboxylic acid groups. Suitable initiator compounds include monoalcohols such as methanol, ethanol, n-propanol, isopropanol, n-butanol, isobutanol, t-butanol, octanol, octadecanol, 3-butene-1-ol, 2-methyl-2-propanol, 2-methyl-3-butene-2-ol and the like. Suitable polyalcohol initiators include ethylene glycol, propylene glycol, glycerine, 1,1,1-trimethylol propane, 1,1,1-trimethylol ethane, 1,2,3-trihydroxybutane, pentaerythritol, xylitol, arabitol, mannitol, sucrose, sorbitol, alkyl glucosides such as methyl glucoside and ethyl glucoside and the like. Polyether polyols are also useful initiator compounds. The suitable polyether polyols include those having a relatively low equivalent weight, such as less than 350 and especially from about 125–250. However, higher equivalent weight polyols, such as those having equivalent weights of up to 6000 or more, particularly from about 350 to about 4000, are also useful. These polyether polyol initiators can be, for example, polymers of propylene oxide, butylene oxide, tetramethylene oxide, ethylene oxide, and the like. Other types of polymers that contain oxyalkylatable groups, such as hydroxy-functional, thiol-functional, primary or secondary amine-functional polymers, (including functionalized polyethylenes, polystyrenes, polyesters, polyamides and the like) are suitable initiators.

Among the alkylene oxides that can be polymerized with the catalyst complex of the invention are ethylene oxide, propylene oxide, 1,2-butylene oxide, styrene oxide and mixtures thereof. Various alkylene oxides can be polymerized sequentially to make block copolymers. More preferably, the alkylene oxide is propylene oxide or a mixture of propylene oxide and ethylene oxide and/or butylene oxide. Especially preferred are propylene oxide alone or a mixture of at least 75 weight % propylene oxide and up to about 25 weight % ethylene oxide.

The method of the invention is suitably used to produce EO-capped polyols, especially to EO-cap polyols that have secondary hydroxyl groups such as poly(propylene oxide) and poly(butylene oxide) polyols. This can be done by (1) a sequential polymerization of PO or BO, followed by EO, using the supported phosphazenium or supported phosphazene catalysts of the invention or (2) by polymerizing EO (using the supported phosphazenium or supported phosphazene catalysts of the invention) onto a previously-formed poly(propylene oxide) polyol. The previously-formed poly(propylene oxide) polyol may be a homopolymer of propylene oxide or a random copolymer of PO, such as a random PO/EO copolymer. The previously-formed poly(propylene oxide) polyol may be formed using conventional alkali metal or alkaline earth metal hydroxide catalysts such as KOH, NaOH, CsOH, BaOH and the like, or using double metal cyanide (DMC) catalysts as are described in U.S. Pat. Nos. 3,278,457, 3,278,458, 3,278,459, 3,404,109, 3,427,256, 3,427,334, 3,427,335 and 5,470,813, among many others. In the case where the poly(propylene oxide) polyol is made using DMC catalysts, the DMC catalyst may be inactivated and/or removed prior to performing the EO capping, but this is not necessary. If desired, the DMC catalyst may be left in the poly(propylene oxide) polyol in an active form, until the EO capping step is done. The addition of the supported phosphazenium or phosphazene catalyst in the EO capping process will deactivate the DMC.

Especially preferred EO capped polyols made in this manner have an equivalent weight of about 1000–3000 and an EO cap that constitutes about 8–30% of the total weight of the polyol. However, the EO capping can be performed on lower equivalent weight polyol initiators (i.e., 125–1000 equivalent weight) to form EO caps that constitute, for example, up to 80% of the total weight of the polyol.

In addition, monomers that will copolymerize with the alkylene oxide in the presence of the catalyst complex can be used to prepare modified polyether polyols. Such comonomers include oxetanes as described in U.S. Pat. Nos. 3,278,457 and 3,404,109, and anhydrides as described in U.S. Pat. Nos. 5,145,883 and 3,538,043, which yield polyethers and polyester or polyetherester polyols, respectively. Hydroxyalkanoates such as lactic acid, 3-hydroxybutyrate, 3-hydroxyvalerate (and their dimers), lactones and carbon dioxide are examples of other suitable monomers that can be copolymerized with the catalyst of the invention.

The polymerization reaction typically proceeds well at temperatures from about 25 to about 150° C. or more, preferably from about 80–130° C. A convenient polymerization technique involves mixing the supported catalyst and initiator to form the phosphazenium alcoholate, and pressurizing the reactor with the alkylene oxide. Once the polymerization has begun additional alkylene oxide is conveniently fed to the reactor on demand, until enough alkylene oxide has been added to produce a polymer of the desired equivalent weight.

Another convenient polymerization technique is a continuous method. In such continuous processes, the initiator and alkylene oxide (plus any comonomers) are continuously fed into a continuous reactor, such as a continuously stirred tank reactor (CSTR) or a tubular reactor, that contains the supported catalyst of the invention. The product is continuously removed.

The catalyst is easily removed from the product polyether by filtration or other liquid/solid separation technique such as centrifugation. The recovered catalyst can be re-used in further polymerization reactions.

The recovered catalyst may be washed one or more times, preferably multiple times, with water or preferably an organic solvent such as methanol, and then dried prior to being re-used. If the surface of the catalyst becomes fouled or coated with polymer, the catalyst may be washed or treated to remove the fouling or polymer coating.

The following examples are provided to illustrate the invention, but are not intended to limit its scope. All parts and percentages are by weight unless otherwise indicated.

EXAMPLE 1

A. Preparation of Phosphazenium—Containing Macroporous Polymer Beads 0.74 grams of chloromethylated polystyrene-divinylbenzene macroporous copolymer beads (6% DVB, 250 micron average diameter, approximately 4 meq. Cl/g, approximately 2.96 mmol Cl) are extensively washed with methanol and dried in a vacuum oven at 50° C. Anhydrous tetrahydrofuran (10 mL) is added to the copolymer beads in a septum-capped 2-ounce (60 mL) bottle in a nitrogen atmosphere dry box. The resin beads are allowed to swell for 15 minutes. Phosphazene Base $P_2$-Et (1-Ethyl-2,2,4,4,4-pentakis(dimethylamino)$2\lambda^5,4\lambda^5$,-catenadi(phosphazene), Fluka catalog #79417, 1.00 g, 2.96 mmol) is added and the mixture is allowed to react without stirring for 7 days at 60° C. After reaction, the mixture is cooled to room temperature. The supernatant is removed from the co-polymer beads utilizing a small-bore needle.

Fresh anhydrous tetrahydrofuran (10 mL) is added back to the beads. The mixture is allowed to stand for 10–15 minutes with occasional swirling. The supernatant (THF wash solution) is removed from the copolymer beads again utilizing a small-bore needle. This THF washing procedure is repeated for a total of four THF washings. The beads are then dried for 18 hours under a stream of dry nitrogen. The final beads (1.70 g) are opaque and white in color. The proposed reaction is illustrated below:

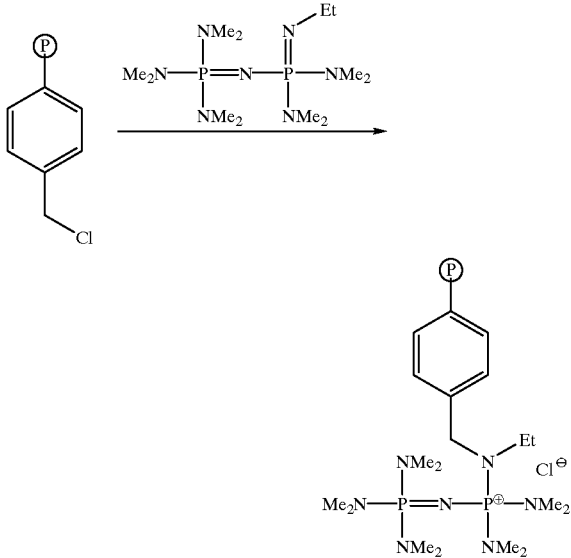

To convert the resin to the hydroxide form, it is mixed with anhydrous methanol (10 mL) and the resulting slurry is then mixed with 5 mL of 1 Molar tetrabutylammonium hydroxide solution in methanol. The beads are allowed to stand for 10–15 minutes with occasional swirling. The supernatant is removed from the copolymer beads, again utilizing a small-bore needle. This methanolic tetrabutylammonium hydroxide solution washing procedure is repeated for a total of four washings. The beads are then repeatedly washed as before with fresh, anhydrous methanol (10 mL each wash) for a total of four washes. The beads are then again dried for 18 hours under a stream of dry nitrogen, providing opaque, white catalyst beads (1.65 g).

A portion of the beads is slurry-washed three or four times on a fritted glass funnel with a mixture of methanol and up to 10 weight % of aqueous sodium hydroxide. The beads are then washed three or four times with a mixture of methanol and a 3 weight % aqueous sodium hydroxide solution. The beads are then washed extensively with water, then finally washed extensively with methanol. The beads are then dried overnight in a vacuum oven at 50° C., providing light tan catalyst beads (Supported Catalyst A).

B. Polymerization of Propylene Oxide

Supported Catalyst A is evaluated by mixing 0.12 g of a 700 MW poly(propylene oxide) triol, 0.58 g propylene oxide and a measured amount of the catalyst to a sealed vial, and heating at 90° C. for 4 hours without stirring. The conversion of the propylene oxide is then determined as an indication of the activity of the catalyst. The amount of catalyst is about 17,000 parts of catalyst per million parts of combined weight of initiator and propylene oxide charged to the vial. This corresponds to about 0.02 mmol of phosphazenium groups. 74% of the propylene oxide is converted to polymer. Gel permeation chromatography (GPC) analysis confirms the presence of higher molecular weight poly(propylene glycol) with no peak corresponding to unreacted initiator. Supported Catalyst A is removed from the product, washed 5 times with warm isopropanol, and dried overnight in a vacuum oven at 50° C./<30 inches (<76.2 cm) Hg vacuum. It is then reused in a second polymerization under the same conditions. This time, 71% of the propylene oxide is converted to polymer. When recycled three more times in the same manner, propylene oxide conversions of 81%, 52% and 27% are seen. The drop-off in propylene oxide conversion is believed to be due to some fracturing of the resin during use and recycling.

Supported Catalyst A is evaluated a second time under the same conditions, except the catalyst amount is about 42,000 ppm and the reaction time is 5.5 hours. 100% conversion of propylene oxide is seen.

Supported Catalyst A is evaluated a third time under the same conditions, except the catalyst amount is about 8600 ppm and the reaction time is 4.5 hours. 76% conversion of propylene oxide is seen.

Supported Catalyst A is evaluated a fourth time under the same conditions, except the catalyst amount is about 8300 ppm, the reaction time is 20 hours and the reaction mixture is stirred. 100% conversion of propylene oxide is seen. However, this causes significant degradation of the polymer beads.

EXAMPLE 2

A. Preparation of Phosphazenium—Containing Gel-type Polymer Beads

Anhydrous toluene (2.1 g) is added to 0.5 g of Merrifield's resin (approximately 1.85 mmol Cl, Aldrich catalog #47, 451–7, chloromethylated gel-type polystyrene-divinylbenzene co-polymer beads, 1% crosslinked, 200–400 mesh, approximately 3.7 milliequivalents Cl/g resin) in a septum-capped 5-mL conical Wheaton vial in a nitrogen atmosphere dry box. The resin beads are allowed to swell for approximately 5 minutes. Phosphazene Base $P_2$-Et (1-Ethyl-2,2,4,4,4-pentakis(dimethylamino) $2\lambda^5,4\lambda^5$,-catenadi (phosphazene), 0.702 g, 2.07 mmol, Fluka catalog #79417) is added and the vial is capped. The mixture is allowed to react without stirring for 4 days at 90° C. After reaction, the mixture consists of light tan beads, which tend to clump together with poor dispersion in the toluene solvent. After cooling to room temperature, the vial is opened and 1.424 g of 1,4-dioxane is added. The vial is recapped and heated for 4 hours at 90° C. The mixture is then cooled to room temperature.

The resulting bead slurry is filtered under vacuum through a medium porosity fritted glass funnel. The beads are washed several times with methanol, then several times with toluene, several more times with methanol, several times with water, several more times with methanol, several times with dichloromethane, and finally several times again with methanol. The beads are then dried in a vacuum oven at 50° C./<30 inches (<76.2 cm) Hg vacuum for 15 hours. The final product (0.899 g) consists of pale tan functionalized polymer beads. The theoretical mass of beads if fully functionalized would be 1.128 g.

Methanol is added to the functionalized beads and the beads are allowed to swell. Water and 25 wt % aqueous sodium hydroxide solution are added and the slurry is stirred and allowed to stand for a couple of minutes. The solution is then slowly drained from the beads by applying suction. This procedure is repeated numerous times with several different mixtures of methanol and aqueous sodium hydroxide, and then with an aqueous sodium hydroxide solution. The beads are then washed extensively with water and then with methanol. The beads are then dried in a vacuum oven at 50° C./<30 inches (<76.2 cm) Hg vacuum for 15 hours. The final product (Supported Catalyst B) is dark brown functionalized polymer beads.

B. Polymerization of Propylene Oxide

Supported Catalyst B is evaluated in the same manner as described in Example 1B. The amount of catalyst is about 8500 parts of catalyst per million parts of combined weight of initiator and propylene oxide charged to the vial. 87% of the propylene oxide is converted to polymer in four hours. Supported Catalyst B is removed from the product, washed 5 times with warm isopropanol, and dried overnight in a vacuum oven at 50° C./<30 inches (<76.2 cm) Hg vacuum. It is then reused in a second polymerization under the same conditions. This time, 43% of the propylene oxide is converted to polymer. When recycled two more times in the same manner, propylene oxide conversions of 28% and 7% are seen.

EXAMPLE 3

A. Preparation of Phosphazenium—Containing Gel-type Polymer Beads

Anhydrous tetrahydrofuran (10 mL) is added to 2-tert-butylimino-2-diethylamino-1,3-dimethyl-perhydro-1,3,2-diazaphosphorine on polystyrene, (BEMP on polystyrene, Fluka catalog #20026, approximately 200–400 mesh, approximately 2.3 mmol base/g resin, 2.0 g polymer, approximately 4.6 mmol BEMP) in a septum-capped 2-ounce (60 mL) bottle in a nitrogen atmosphere dry box. The resin beads are allowed to swell for 15 minutes. Methyl iodide (0.98 g, 6.9 mmol) is added and the mixture allowed to react without stirring for 4 days at 25° C. The beads gradually become slightly yellowish in color upon standing at room temperature. After reaction, the THF and unreacted methyl iodide are removed under a stream of dry nitrogen. The volatiles are first removed at ambient temperature, then the beads are heated to approximately 60–70° C. under the dry nitrogen stream for 2–3 hours. The final product beads (2.75 g) are pale yellow in color. The proposed reaction is illustrated below.

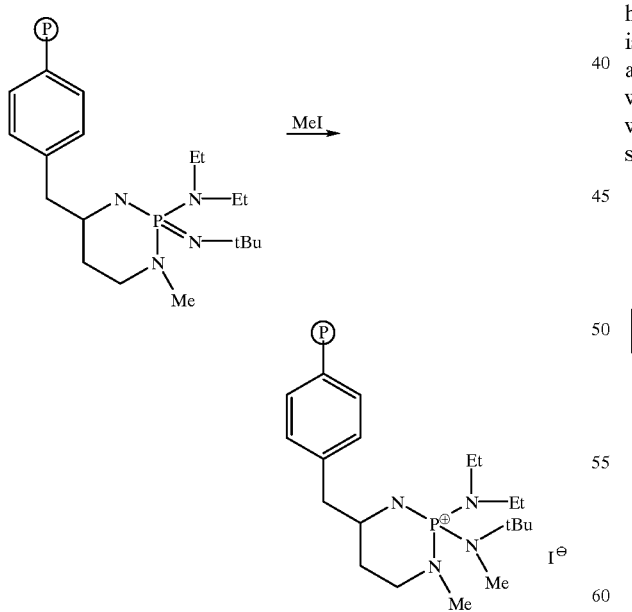

A portion of the beads from above are ion exchanged first with 1 Molar tetrabutylammonium hydroxide solution in methanol, then with methanol/aqueous sodium hydroxide solution in a manner similar to that described in Example 1, to form Supported Catalyst C.

B. Polymerization of Propylene Oxide

Supported Catalyst C is evaluated in the same manner as described in Example 1B, except the reaction time is 5 hours and the reaction mixture is stirred. The amount of catalyst is about 43,000 parts of catalyst per million parts of combined weight of initiator and propylene oxide charged to the vial. 18% of the propylene oxide is converted to polymer. When the catalyst is evaluated again, except at about 46,500 ppm catalyst and for 18 hours, 22% conversion of the propylene oxide is seen.

EXAMPLE 4

A. Preparation of Phosphazenium—Containing Polymer Beads

Anhydrous tetrahydrofuran (THF, 45 mL) is added to 12.50 g of chloromethylated polystyrene-divinylbenzene co-polymer beads (6% DVB, 250 micron macroporous) in a septum-capped 250 mL Erlenmeyer flask with needle vent in a nitrogen atmosphere dry box. Elemental analysis of the resin beads shows carbon, 73.4%, H 6.2%, N<0.5%, P<0.01%, total halogens as chlorine 19.0%, and total halogens as chloride 0.4%. The resin beads are allowed to swell for 5–10 minutes.

Phosphazene Base P2-Et (1-Ethyl-2,2,4,4,4-pentakis (dimethylamino)$2\lambda^5,4\lambda^5$,-catenadi(phosphazene), Fluka catalog #79417, FW 339.41, 20.01 g, 58.95 mmol) is added neat to the swollen beads in approximately 1 mL portions. A moderate exotherm is observed upon adding the phosphazene to the bead slurry. A small amount of additional THF is used to rinse the side of the vessel, to bring the total amount of THF used to about 60 mL. The mixture is then warmed on a hotplate within the drybox and allowed to react without stirring for 65 hours at 50–60° C. The reaction sequence is illustrated below.

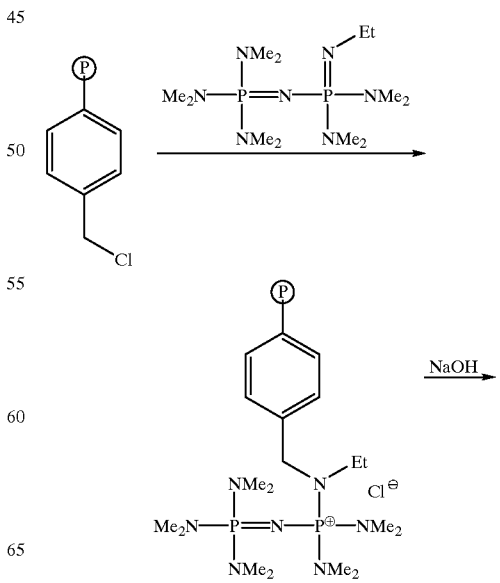

-continued

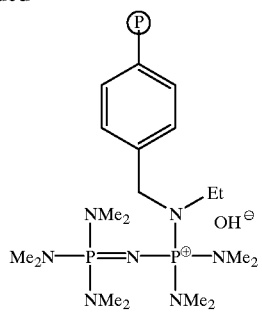

After reaction, the mixture is cooled to room temperature and removed from the drybox. The slurry consists of white beads with an essentially colorless but slightly cloudy supernatant. The beads are filtered, slurried in fresh tetrahydrofuran (100 mL) and drained. This washing procedure is repeated for a total of six washes. The washed, white beads are then dried in a vacuum oven at 50° C./<30 inches (<76.2 cm) Hg vacuum for 18 hours, providing 32.04 g of white resin beads. The functionalized beads are estimated to contain 57.57 mmol of phosphazenium groups. This corresponds to approximately 1.797 mmol phosphazenium groups (in the Cl- form) per gram of resin beads.

B. Ion Exchange to the Hydroxide Form

The beads from part A are swollen in methanol, drained using vacuum filtration and then slurry-washed batchwise with approximately 400 mL of a nitrogen sparged 50/50 vol/vol mixture of methanol and a 9.3 wt % aqueous NaOH solution, as follows:

First, the beads are washed by adding a portion of the methanol/NaOH solution (approximately 100 ml) to the methanol-swollen beads and stirring briefly. The beads are allowed to drain slowly for 5–10 minutes the remaining liquid removed by vacuum filtration. The beads are then washed three more times by adding more of the nitrogen sparged methanol/NaOH solution directly to the briefly vacuum filtered beads and soaking/draining as described above. A total of 4–100 mL washes are conducted with this methanol/NaOH solution.

Next, the beads are washed with a nitrogen sparged 2.9 wt-% aqueous NaOH solution. The NaOH solution (100 mL) is added to the beads, the resulting slurry is stirred briefly, and the solution is drained slowly as before, followed by vacuum filtration. This is repeated for a total of 4 washes.

Finally, the beads are washed in like manner six times with 100 mL deionized water each time. After the final wash, the beads are vacuum filtered and dried in a vacuum oven at 50° C./<30 inches (<76.2 cm) Hg vacuum for 64 hours, to a final weight of 31.57 g. The product is estimated to contain 57.57 mmol of phosphazenium groups (hydroxide form), which corresponds to approximately 1.82 mmol quat. hydroxide/g resin beads. Elemental analysis shows the product beads to contain carbon 55.2%, H 9.0%, N 17.0%, P 11.7%, total halogens as chlorine 3.0%, and total halogens as chloride 2.6%. The base number is 0.64 meq/g resin.

C. Polymerization of Propylene Oxide

The supported catalyst from part B is evaluated in the same manner as described in Example 1B. The amount of catalyst is about 17,000 parts of catalyst per million parts of combined weight of initiator and propylene oxide charged to the vial. This amount of catalyst is estimated to contain 0.022 mmol of phosphazenium groups. 92% of the propylene oxide is converted to polymer in four hours.

D. EO-Capping of Poly(Propylene Oxide)

892 mg of the supported catalyst from part B is dried to a weight of 811 mg, and mixed with 60 grams of a 1433 equivalent weight nominally trifunctional poly(propylene oxide) that is prepared using KOH catalysis. The mixture contains approximately 200 ppm water. In order to convert this water to polyol, a propylene oxide polymerization is first performed, followed by EO capping. The mixture is sealed into a pressure reactor and then heated to 90° C. The reactor is then pressurized to 30 psig (206.8 kPa) with nitrogen, and propylene oxide is added to bring the reactor pressure to 60 psig (413.7 kPa). Reaction of the PO is evidenced by a drop in reactor pressure. As the reaction proceeds, each time the reactor pressure drops to 55 psig (379.2 kPa), additional PO is added to restore the pressure to 60 psig (413.7 kPa). This is continued until 15 ml of propylene oxide has been consumed. The result is the formation of a polyol containing terminal secondary hydroxyl groups. The oxide feed is then switched to ethylene oxide, and a total of 30 ml of ethylene oxide is fed in the same manner. The resulting product is a liquid at room temperature. $^{13}$C NMR indicates that 49% of the secondary hydroxyl groups have been capped with ethylene oxide to form primary hydroxyl groups.

E. EO-Capping of DMC-Catalyzed Poly(Propylene Oxide)

800 mg of the supported catalyst from part B is mixed with 7.3 g. propylene oxide and 60 grams of a 3000 molecular weight nominally trifunctional poly(propylene oxide) that is prepared using DMC catalysis (containing 597 ppm water). The mixture is sealed into a pressure reactor and then heated to 110° C. with stirring for 200 minutes. This allows propylene oxide to add onto the water to form a secondary hydroxyl-terminated polyol. The reactor is then pressurized to 35 psig (241.3 kPa) with nitrogen, and ethylene oxide is added to bring the reactor pressure to 70 psig (482.6 kPa). Reaction of the EO is evidenced by a drop in reactor pressure. As the reaction proceeds, each time the reactor pressure drops to 65 psig (448.2 kPa), additional EO is added to restore the pressure to 70 psig (482.6 kPa). This is continued until 27 ml of ethylene oxide has been consumed. The resulting product is a liquid at room temperature. $^{13}$C NMR indicates that 43% of the secondary hydroxyl groups have been capped with ethylene oxide to form primary hydroxyl groups. The molecular weight of the product (by GPC) shows an increase from 3000 to 4041.

What is claimed is:

1. A method for producing a polyether comprising subjecting an alkylene oxide to polymerization conditions in the presence of an initiator compound and a catalytically effective amount of a crosslinked organic polymer having pendant phosphazene or phosphazenium groups wherein said crosslinked organic polymer is substantially insoluble in said alkylene oxide and said polyether.

2. The method of claim 1 wherein the crosslinked organic polymer contains pendant phosphazenium groups having from about 1 to about 6 phosphorus atoms.

3. The method of claim 2 wherein said alkylene oxide is ethylene oxide, propylene oxide, 1,2-butylene oxide, or a mixture thereof.

4. The method of claim 2 wherein the alkylene oxide is ethylene oxide, the initiator compound is a secondary hydroxyl-terminated polyether polyol and the resulting polyether is EO-capped.

5. The method of claim 4 wherein the secondary hydroxyl-terminated polyether polyol is a poly(propylene oxide) polyol made using a DMC catalyst.

6. The method of claim 3 wherein said crosslinked organic polymer has a structure represented by the general formula

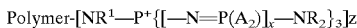
Polymer-[NR$^1$—P$^+${[—N═P(A$_2$)]$_x$—NR$_2$}$_3$]$_z$ wherein R and R$^1$ are independently in each occurrence (a) an unsubstituted or inertly substituted alkyl or aryl group, (b) an unsubstituted or inertly substituted alkylene or arylene group that, together with another R or R$^1$ group on the same nitrogen atom, forms a ring structure including that nitrogen atom, (c) an unsubstituted or inertly substituted alkylene or arylene group that, together with a R or R$^1$ group bonded to a different nitrogen atom bonded to a common phosphorus atom, forms a ring structure including an —N—P—N— or —N—P═N— moiety, or (d) hydrogen; each A is independently —[N═P(A$_2$)]$_x$—NR$_2$; x is zero or a positive integer; and z is a positive integer.

7. The method of claim 6 wherein each R is a C$_{1-10}$ alkyl group, or together with another R forms a C$_{2-5}$ alkylene group that forms part of a ring structure with a nitrogen atom or an —N—P—N— or —N—P═N— moiety, and each R$^1$ is hydrogen, methyl or ethyl, or together with an R group forms a C$_{2-5}$ alkylene group that forms part of a ring structure with a nitrogen atom or an —N—P—N— or —N—P═N— moiety.

8. The method of claim 7 wherein each R is methyl or ethyl, and each R$^1$ is hydrogen, methyl or ethyl.

9. The method of claim 3 wherein said crosslinked organic polymer has a structure represented by the general formula

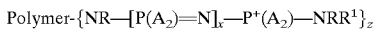
Polymer-{NR—[P(A$_2$)═N]$_x$—P$^+$(A$_2$)—NRR$^1$}$_z$ wherein R and R$^1$ are independently in each occurrence (a) an unsubstituted or inertly substituted alkyl or aryl group, (b) an unsubstituted or inertly substituted alkylene or arylene group that, together with another R or R$^1$ group on the same nitrogen atom, forms a ring structure including that nitrogen atom, (c) an unsubstituted or inertly substituted alkylene or arylene group that, together with a R or R$^1$ group bonded to a different nitrogen atom bonded to a common phosphorus atom, forms a ring structure including an —N—P—N— or —N—P═N— moiety, or (d) hydrogen; each A is independently —[N═P(A$_2$)]$_x$—NR$_2$; x is zero or a positive integer, and z is a positive integer.

10. The method of claim 9 wherein each R is a C$_{1-10}$ alkyl group, or together with another R forms a C$_{2-5}$ alkylene group that forms part of a ring structure with a nitrogen atom or an —N—P—N— or —N—P═N— moiety, and each R$^1$ is hydrogen, methyl or ethyl, or together with an R group forms a C$_{2-5}$ alkylene group that forms part of a ring structure with a nitrogen atom or an —N—P—N— or —N—P═N— moiety.

11. The method of claim 10 wherein each R is methyl or ethyl, and each R$^1$ is hydrogen, methyl or ethyl.

12. The method of claim 1 wherein the crosslinked organic polymer contains pendant phosphazene groups having from about 2 to about 6 phosphorus atoms.

13. The method of claim 12 wherein said alkylene oxide is ethylene oxide, propylene oxide, 1,2-butylene oxide, or a mixture thereof.

14. The method of claim 12 wherein the alkylene oxide is ethylene oxide, the initiator compound is a secondary hydroxyl-terminated polyether polyol and the resulting polyether is EO capped.

15. The method of claim 14 wherein the secondary hydroxyl-terminated polyether polyol is a poly(propylene oxide) polyol made using a DMC catalyst.

16. The method of claim 12 wherein said crosslinked organic polymer has pendant phosphazene groups and a structure represented by the general formula

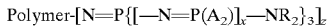
Polymer-[N═P{[—N═P(A$_2$)]$_x$—NR$_2$}$_3$]$_z$ wherein each R is independently (a) an unsubstituted or inertly substituted alkyl or aryl group, (b) an unsubstituted or inertly substituted alkylene or arylene group that, together with another R group on the same nitrogen atom, forms a ring structure including that nitrogen atom, (c) an unsubstituted or inertly substituted alkylene or arylene group that, together with a R group bonded to a different nitrogen atom bonded to a common phosphorus atom, forms a ring structure including an —N—P—N— or —N—P═N— moiety, or (d) hydrogen; each A is independently —[N═P(A$_2$)]$_x$—NR$_2$; each x is zero or a positive integer provided that the number of phosphorus atoms in each phosphazene group from 2–6, and z is a positive number.

17. The method of claim 16 wherein each R is a C$_{1-10}$ alkyl group, or together with another R forms a C$_{2-5}$ alkylene group that forms part of a ring structure with a nitrogen atom or an —N—P—N— or —N—P═N— moiety.

18. The method of claim 17 wherein each R is methyl or ethyl.

19. The method of claim 12 wherein said crosslinked organic polymer has pendant phosphazene groups and a structure represented by the general formula

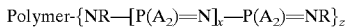
Polymer-{NR—[P(A$_2$)═N]$_x$—P(A$_2$)═NR}$_z$ wherein each R is independently in each occurrence (a) an unsubstituted or inertly substituted alkyl or aryl group, (b) an unsubstituted or inertly substituted alkylene or arylene group that, together with another R group on the same nitrogen atom, forms a ring structure including that nitrogen atom, (c) an unsubstituted or inertly substituted alkylene or arylene group that, together with a R group bonded to a different nitrogen atom bonded to a common phosphorus atom, forms a ring structure including an —N—P—N— or —N—P═N— moiety, or (d) hydrogen; each A is independently —[N═P(A$_2$)]$_x$—NR$_2$, each x is independently zero or a positive integer provided that the number of phosphorus atoms in each phosphazene group from 2 to about 6 and z is a positive integer.

20. The method of claim 19 wherein each R is a C$_{1-10}$ alkyl group, or together with another R forms a C$_{2-5}$ alkylene group that forms part of a ring structure with a nitrogen atom or an —N—P—N— or —N—P═N— moiety.

21. The method of claim 20 wherein each R is methyl or ethyl.

* * * * *